United States Patent Office 2,852,474
Patented Sept. 16, 1958

2,852,474

IMPREGNATION PROCEDURE FOR MANUFACTURING HYDROFORMING CATALYSTS

Erving Arundale, Westfield, Walter R. F. Guyer, Roselle, and John P. Thorn, Elizabeth, N. J., assignors to Esso Research and Engineering Company, a corporation of Delaware No Drawing. Application September 4, 1951
Serial No. 245,072

10 Claims. (Cl. 252—466)

This invention relates to the preparation of hydroforming catalysts and more particularly to the preparation of platinum—or palladium—containing catalysts which are suitable for the conversion of hydrocarbon fractions boiling in the motor fuel or naphtha range into products of improved quality and anti-knock properties.

Catalysts containing platinum have been described for various processes in the prior art but, in general, commercial use of said catalysts has been quite limited because of the cost of the platinum. Recently, considerable interest has been shown in a hydroforming process utilizing certain platinum-on-alumina catalysts as disclosed in U. S. Patents 2,479,109 and 2,479,110. In accordance with each of these patents the alumina support must not be dried prior to compositing with the platinum or palladium compound and the final catalyst composition must contain certain percentages of added halogen.

More recently it has been found that platinum-on-alumina catalysts, which are particularly effective for hydroforming naphtha fractions, can be prepared using "activated alumina" of commerce as the catalyst support. In this procedure, the activated alumina is pulverized and dried and then treated with an aqueous solution of hydrogen fluoride until the hydrogen fluoride solution is substantially completely absorbed by the alumina. The treated alumina is allowed to stand for an extended period of time to permit reaction between the hydrogen fluoride and the activated alumina base, whereupon it is dried at a moderate temperature for an extended period of time. The dried mixture, substantially at room temperature, is granulated and then treated with a solution of a platinum compound such as chloroplatinic acid, or the like, until the solution is substantially completely absorbed by the treated activated alumina. Just sufficient water is added with the platinum-containing solution to form a paste and to permit dispersion of the platinum compound throughout the alumina base in a homogeneous manner. Hydrogen sulfide is then bubbled through or otherwise contacted with the said paste, whereupon the pasty mixture is allowed to stand a short time and is then dried at a moderate temperature. The resulting product is broken up into a powder and, if desired, formed into pills. The catalyst in the desired form is then calcined at an elevated temperature and preferably after calcination the catalyst is reduced with hydrogen and is then ready for use in the hydroforming process. As an alternative to the above procedure in which the activated alumina is HF treated and platinum then precipitated thereon, it is also possible to first soak the activated alumina in the platinum-containing solution, then precipitate the platinum and finally treat the platinum-containing alumina with hydrogen fluoride, or to combine the hydrogen fluoride with the platinum-containing solution and then apply the hydrogen fluoride and the platinum to the alumina support simultaneously.

It has been found that catalysts prepared in this way are particularly effective, giving a considerably improved yield-octane relationship when used for hydroforming naphtha fractions at conventional hydroforming pressures of about 200 p. s. i. g. However, when operating continuously on feed at the 200 lb. level, the activity of the catalyst declines approximately 0.1 octane unit per hour because of the deposition of carbonaceous material. While some restoration of activity can be achieved by treatment of the spent catalyst with hydrogen-rich gas, it eventually is necessary to burn off carbonaceous deposits with air or an oxygen-containing gas. Unfortunately, air regeneration tends to effect a permanent deactivation of these platinum-containing catalysts.

The above mentioned procedures for preparing platinum-containing catalysts are time consuming and require two careful drying operations. The drying of the alumina base after impregnation with the solution of the catalytic metal compound is especially critical and must ordinarily be effected slowly and at low temperatures in order to avoid the development of extreme concentration gradients of the catalytic element or compound. Considerable effort has been and is being made to develop simpler methods of preparing platinum-containing catalysts and particularly to the development of platinum-containing catalysts that are regenerable without suffering a serious loss in activity.

It is the object of this invention to provide the art with an improved method for preparing alumina supported platinum and palladium catalysts.

It is also the object of this invention to provide a simplified procedure for preparing alumina supported platinum using activated alumina of commerce as the support, which catalysts are particularly effective in the hydroforming of hydrocarbon fractions boiling in the naphtha range at pressures of about 200 p. s. i. g.

These and other objects will appear more clearly from the detailed specification and claims which follow.

It has now been found that platinum on alumina and palladium on alumina catalysts which are especially suitable for hydroforming naphtha fractions, preferably at pressures of about 200 p. s. i. g. can be prepared if certain wetting and/or dispersing agents are included in the catalytic metal compound impregnating solution. The exact choice of such a wetting or dispersing agent will be influenced by the acidity or the alkalinity of the impregnating solution and should be of the non-ashing tube. The impregnated alumina is thereupon dried at temperatures of up to about 700° F. and then heated at a rate of about 50°–75° F. per hour and calcined at about 900°–1000° F., preferably in the presence of a hydrogen-rich gas at said temperatures until activated or the impregnated alumina is sulfided and dried in the presence of air or an inert atmosphere, and then activated in the presence of hydrogen, or it may be dried under controlled conditions between 100° and 700° F. contacted with gaseous hydrogen sulfide to which hydrogen fluoride may be added, if desired, and then activated by calcining at 900°–1000° F.

Activated aluminas which are used as the support for the catalysts in accordance with the present invention are well known in the art and may be readily purchased commercially. Two activated aluminas which have been used in the preparation of these catalysts are the following grades of Alorco alumina manufactured and sold by the Aluminum Company of America:

| Alorco Grade | F-10 | H-41 |
|---|---|---|
| Surface Area, m.²/g | 90–125 | 200–300 |
| Pore Size, Angstroms | 40 | 30 |
| Porosity, Percent | 35 | 50 |
| Approximately Chemical Analysis, wt. percent: | | |
| $Al_2O_3$ | 96 | 90 |
| $SiO_2$ | 0.1 | 5.5 |
| $Na_2O$ | 0.1 | 0.1 |
| $Fe_2O_3$ | 0.05 | 0.12 |
| Loss on Ignition at 950° F | 3.0 | 8.5 |

It will be understood that these activated aluminas are merely typical and that other activated aluminas of commerce can also be employed.

The activated alumina may be used as received, or after drying and it may, if desired, be given a preliminary treatment with hydrogen fluoride. In the latter case the activated alumina is pulverized and dried and then treated with an aqueous solution of hydrogen fluoride until the hydrogen fluoride solution is substantially completely absorbed by the activated alumina. The mixture is allowed to stand for an extended period of time to permit reaction between the hydrogen fluoride and the activated alumina base. The mixture is then dried at a moderate temperature for an extended period of time.

The activated alumina with or without treatment with hydrogen fluoride is then mixed with a solution of chloroplatinic acid or palladium chloride containing a small amount of a non-ashing dispersing and/or wetting agent. Sufficient water is added with the platinum- or palladium-containing solution to form a paste and to permit dispersion of the impregnating metal compound throughout the alumina base in a homogeneous manner. If desired the activated alumina may be contacted with a large volume of very dilute solution of the platinum or palladium compound and maintained in contact therewith until the platinum or palladium is substantially completely adsorbed by the alumina. As a general rule, sufficient chloroplatinic acid is incorporated to leave about 0.1 to 2.0 wt. percent of platinum in the finished catalyst or sufficient palladium chloride is incorporated to leave from 0.5 to 5.0 wt. percent of palladium in the finished catalyst.

The dispersing and/or wetting agents that can be utilized in accordance with the present invention are those which vaporize upon heating to higher temperatures or which decompose to carbon or carbon-oxygen material and do not deposit an inorganic ash deleterious to the catalyst. The exact choice of such a wetting or dispersing agent is in part influenced by the acidity or alkalinity of the impregnating solution. Suitable wetting and/or dispersing agents which may be used in accordance with this invention include poly-oxyethylene esters of mixed fatty and resin acids, poly-oxyethylene sorbitan fatty acid esters; condensation products of phenol, or higher aliphatic alcohols with ethylene oxide; and quaternary ammonium compounds such as cetyl dimethyl benzyl ammonium chloride. The amount of wetting or dispersing agent is ordinarily about 0.05 to 2.5 wt. percent of the impregnating solution. Somewhat greater amounts may be used without any appreciable advantage and with a possibility that amounts of the order of about 10 wt. percent will have a deleterious effect upon the catalyst.

The alumina containing the chloroplatinic acid or palladium chloride can be treated in various ways in order to complete the preparation of the catalyst.

One way of completing the preparation of the catalyst is to bubble hydrogen sulfide through or otherwise contact hydrogen sulfide with the paste whereupon the resultant sulfided pasty mixture is allowed to stand a short time and is then dried at a moderate temperature. The resulting product is broken up into a powder and, if desired, formed into pills. The catalyst in the desired form is then either calcined at elevated temperatures and reduced with hydrogen whereupon it is ready for use in the hydroforming process or the sulfided paste after drying at temperatures up to about 300° F. in the presence of air or an inert gas, is then directly reduced with hydrogen at temperatures increasing up to 800°–1000° F.

It is also possible to complete the preparation of the hydroforming catalyst by drying the pasty mass of alumina containing the platinum or palladium compound at temperatures from 250° F. up to 700° F. and then slowly calcining at temperatures up to 900°–1000° F., or reducing the dried mixture with hydrogen while heating the same to temperatures of 900°–1000° F. The use of wetting and/or dispersing agents in accordance with the present invention results in an improved dispersion of catalytic element on the support and makes it possible to conduct the drying steps more rapidly and at higher temperature levels without the development of concentration gradients of the catalytic element of compound on the alumina.

The following examples are illustrative of the preparation of catalysts in accordance with the present invention as well as of the improved results that are obtainable when said catalysts are used in the hydroforming of naphtha or motor fuel fractions.

EXAMPLE I

Alorco H–41 alumina was pulverized so that about 80% of the material passed a No. 60 (U. S.) sieve, and was then dried at a temperature of about 250° F. overnight or for about 16 hours. A solution was made by diluting 113 grams of platinum chloride stock solution (1 g.=0.0377 g. Pt) to 750 cc. This solution was added to 850 grams of the dried alumina so as to form a paste, and hydrogen sulfide was then bubbled through the paste for 1.5 hours. The catalyst was dried overnight at room temperature, and then put into a cold oven and brought to 250° F., and dried overnight or for about 16 hours at that temperature. The catalyst was pilled and then heated to 950° F. in a muffle furnace and calcined for 2 hours at that temperature.

EXAMPLE II

About 132 grams of platinum stock solution (1 g.= 0.0377 g. Pt) were combined with 780 cc. of solution containing 4.3 grams of Emulphor ON (polyethylene ether of a long chain fatty alcohol) a non-ionic type of dispersing agent sold by General Dyestuff Corp. This composite solution was slowly added to 1000 grams of Alorco H–41 alumina. The alumina had previously been pulverized so that about 80% of the material passed a No. 60 (U. S.) sieve, and was dried at a temperature of about 250° F. A very smooth paste was produced, and this was sulfided by bubbling hydrogen sulfide through the paste for 1.5 hours. The catalyst was dried overnight at room temperature, and then was placed into a cold oven which was brought to 250° F. and held there overnight. The catalyst was pilled, and then slowly calcined to 950° F., and held at that temperature for 2 hours. This catalyst was charged directly to a hydroforming unit.

The above examples give specific details for the production of an improved catalyst in accordance with the present invention and while the inclusion of a non-ashing type of dispersing agent is essential, certain of the conditions may be varied and need not be exactly restricted to those given in the example. For example, drying of the ground, activated alumina may be at 212° F. to 950° F. for 2 to 24 hours, the shorter times being used at the higher temperatures. The mixing of the aqueous HF solution (if used) with the dried, ground activated alumina may be continued for about ten minutes to about one hour, while adding water, if necessary, to maintain a pasty condition of the mixture but excessive water addition in connection with the HF treatment is to be avoided. The paste may be allowed to stand at room temperature from about 2 hours to 24 hours to allow time for the reaction between the hydrogen fluoride and the alumina base. The paste may then be slowly dried at a temperature of about 212° F. to 400° F. for about 8 to 24 hours, the shorter times applying to the higher temperatures.

After the addition of the chloroplatinic acid solution to the activated alumina or to the HF treated and dried alumina to form a paste, the mixing may continue for five minutes to one hour at room temperature. The alumina containing the platinum compound may then be dried and calcined or it may be treated at room temperature with $H_2S$ by bubbling $H_2S$ gas through the paste while mixing for about ten minutes to three hours.

The hydrogen sulfide treatment may be carried out, if desired, under superatmospheric pressure. This permits the use of shorter treating times. As another alternative the alumina, HF treated or not, may be put under subatmospheric pressure to degas the alumina by evacuation and then treated with the platinum-containing solution while restoring the same to atmospheric pressure or applying superatmospheric pressure to obtain improved impregnation of the alumina with the platinum. After the addition of $H_2S$ gas the sulfided mixture may be allowed to stand 15 minutes to 24 hours at room temperature. The sulfided mixture may then be dried at about 212° to 400° F. for about 2 hours to 24 hours, the shorter times being employed at the higher temperatures. The catalyst, in pilled or powdered form, may be calcined at 800° F. to 1000° F. for about 1 hour to 8 hours, and then reduced with hydrogen by passing 50 v./v./hr. (volumes of hydrogen per volume of catalyst per hour) to 12,000 v./v./hr. of hydrogen at about 700° F. to 1000° F. for about 2 hours to 12 hours. In this hydrogen treatment the catalyst is slowly raised to the final temperature, as above described, preferably starting at room temperature.

For preparing catalysts containing larger amounts of platinum, larger amounts of chloroplatinic acid are used and for catalysts containing more or less fluorine, different amounts of HF may be used. Gaseous HF may be used but aqueous solutions of HF are preferred. Instead of using fluorine compounds other halogen-containing materials such as hydrochloric acid may be used, but of all the halogens, the fluorine-containing substances are preferred.

The amount of platinum in the finished catalyst is preferably between about 0.1 and 1.0% by weight but in some cases may be as high as 2.0%. The amount of HF used may vary from none to as high as 3% by weight of the catalyst with about 0.5 to 1% HF preferred when used. The H-41 aluminas will generally require smaller HF treats than the F-10 aluminas to produce equivalent results. In general, the use of higher amounts of HF, for the same operating conditions will result in a more active catalyst giving more volatile gasolines (higher Reid vapor pressures) but lower octane number products. In general, it is also preferred to utilize activated aluminas which contain controlled, small amounts of $SiO_2$, for example about 1 to about 11 wt. percent $SiO_2$, preferably from 5 to 6 wt. percent $SiO_2$.

The catalysts prepared in accordance with the present invention are especially suitable for hydroforming hydrocarbon fractions boiling within the motor fuel boiling range. Hydroforming reaction conditions are from about 600° to 1000° F., preferably 800°–950° F. at pressures from atmospheric to 1000 lbs. per sq. inch at naphtha feed rates of about 0.25 to 4.0 v./v./hr. (volumes of liquid feed per volume of catalyst per hour) preferably 1 to 2 v./v./hr. and with the passage of hydrogen-rich gas, preferably recycle process gas through the hydroforming reaction zone at a rate of about 2,000-12,000, preferably about 6,000 cu. ft. per barrel of feed. In the hydroforming process the recycle or hydrogen-rich gas should contain about 60-99% hydrogen by volume. In general, higher feed rates produce essentially the same yield of gasoline but the octane number and volatility are reduced appreciably.

The platinum- and palladium-containing catalysts produced in accordance with the present invention give good results at high pressures of from about 500-1000 lbs. per sq. in. but they are especially effective at low pressures of 50 to about 250 lbs. per sq. inch. In low pressure operation it is necessary periodically to remove carbonaceous deposits from the catalyst particles. This may be done by discontinuing the feed and continuing the circulation of hydrogen-rich gas at the same temperature and pressure or at higher temperatures than are applied during the reaction phase of the operation. It may be necessary periodically to burn off carbonaceous deposits. This may be done preferably under carefully controlled temperature conditions and with combustion gas of low oxygen concentration.

Catalysts prepared as described in Examples 1 and 2 were used to hydroform a heavy virgin naphtha feed having a boiling point range of about 200°–360° F. and a Research octane number (clear) of about 45. The virgin naphtha contained about 40.9 volume percent or 42.6% by weight of $C_7$–$C_{10}$ naphthenes, 51.3 volume percent or 48.5% by weight of $C_7$–$C_{11}$ paraffins and 7.8 volume percent or 8.9% by weight of $C_7$–$C_{10}$ aromatics. About 34.5% by volume of the naphtha feed boiled from the initial boiling point to 250° F., about 28.5% by volume boiled in the range from 250°–295° F. and about 37% by volume boiled in the range from 295° F. to the final boiling point.

The reaction conditions and the characteristics of the products formed are summarized below in Table I.

*Table I*

| Catalyst (Example No.) | (2)[2] | | (1)[2] | | |
|---|---|---|---|---|---|
| Alumina Base | H-41 | | H-41 | | |
| Composition, wt. Percent: | | | | | |
| Alumina | 99.5 | | 99.5 | | |
| Platinum | 0.5 | | 0.5 | | |
| Emulphor ON, wt. Percent | 0.4 | | none | | |
| Column | A | B | C | D | E |
| Feedstock Boiling Range, °F. | | | | | |
| Operative Conditions: | | | | | |
| Temperature, °F | 898 | 898 | 889 | 894 | 892 |
| Pressure, p. s. i. g | 750 | 200 | 200 | 200 | 200 |
| $H_2$/HC mole ratio ([1]) | 5.6 | 5.6 | 5.3 | 4.9 | 7.7 |
| Feed rate, V./V./Hr | 2.1 | 2.1 | 3.3 | 2.4 | 1.0 |
| Reaction Period Length, Hours | 1.5 | 1.5 | 1 | 1 | 2 |
| Hydroforming Results: | | | | | |
| Total $C_4$+Product— | | | | | |
| Research Octane Number, Clear | 79.8 | 91.8 | 84.6 | 87.5 | 91.6 |
| Yield, Vol. Percent | 93.7 | 93.0 | 96.8 | 94.5 | 91.6 |
| Reid Vapor Pressure, Pounds | 6.0 | 7.1 | 9.0 | 8.7 | 8.7 |
| $C_5$+Condensate— | | | | | |
| Research Octane Number, Clear | 77.8 | 90.5 | 82.2 | 85.2 | 90.3 |
| Yield, Vol. Percent | 86.2 | 82.8 | 85.1 | 83.1 | 81.8 |
| Reid Vapor Pressure, Pounds | 1.7 | 1.3 | 2.7 | 2.0 | 3.2 |
| 10 Pound Reid Vapor Pressure Basis— | | | | | |
| Research Octane Number, Clear | 81.4 | 92.4 | 85.0 | 87.7 | 91.9 |
| Yield, Vol. Percent | 100.1 | 97.5 | 98.6 | 96.0 | 94.5 |

[1] Each $H_2$/HC (hydrocarbon) mol ratio is approximately equivalent to 1000 cubic feet of hydrogen per barrel of naphtha feed.
[2] Catalyst treated with $H_2$ while heating to 900° F. over a period of 8 hrs. and contacted with $H_2$ at this temperature for additional 8 hrs. before charging feed.

It may readily be seen from the above data that the catalyst of Example II prepared in accordance with the present invention gave higher yields of a higher octane number product than the catalyst of Example I which is a high activity catalyst prepared in accordance with the teachings of copending application Serial No. 202,130, filed December 21, 1950.

EXAMPLE III

Catalysts prepared as per Examples I and II were utilized for hydroforming a 200°–330° F. virgin naphtha at 200 lbs. per sq. inch and 900° F. in which the catalyst was alternately on stream and on regeneration to remove carbonaceous deposits. The operating conditions and the results obtained are summarized below in Table 2.

Table 2
ACTIVITY MAINTENANCE OF PLATINUM-ALUMINA HYDROFORMING CATALYSTS
[Catalysts: 0.5+ Pt on Alorco H-41 Al₂O₃.]

| | Operating Conditions | |
|---|---|---|
| | Reaction Period | Regeneration Period |
| Pressure, p. s. i. g. | 200 | 0 |
| Temperature, °F. | 900 | 950 (max.) |
| Period Length, Hours | 4 | 2-3 |
| Feed Rate, W./Hr./W. | 1 | |
| Recycle Gas, s. c. f./bbl. | 6,000 | |

RESEARCH OCTANE NUMBER (CLEAR) OF UNSTABILIZED C₅+ PRODUCT [1]

| Cycle Number | 1 | 2 | 3 | 4 | 5 | 6 | 7 | 8 | 9 | 10 | 11 | 12 |
|---|---|---|---|---|---|---|---|---|---|---|---|---|
| Catalyst Description: | | | | | | | | | | | | |
| A. Catalyst Example (1) above—Sulfided in absence of dispersing agent [2] | 94.5 | [3] 95.3 | | 91.4 | [3] 83.9 | 88.1 | | 87.3 | [3] 86.4 | 82.7 | | |
| B. Catalyst Example (2) above—Sulfided in presence of 0.4% Emulphor ON dispersing agent [2] | 96.6 | | 94.3 | | 93.1 | 93.3 | | 89.7 | 89.6 | [3] 88.0 | | 88.3 |

[1] Feedstock=200°-330° F. virgin naphtha.
[2] Catalyst reduced with a flow of 6000 s. c. f. H₂/bbl., while raising the temperature 50-75° F./hour.
[3] Octane number on stabilized C₅+ product.

It may be seen by comparison of the octane number of the respective products that the catalyst prepared with a dispersing agent in accordance with the present invention yielded a product at the first cycle having a Research Octane No. of 96.6 as against an Octane No. of 94.5 for the product formed with the catalyst prepared in the absence of the dispersing agent. It should be further noted that the octane number of the product formed had dropped to 91.4 at the fourth cycle, to 87.3 at the eighth and to 82.7 at the tenth cycle while the product formed with the catalyst prepared in accordance with the present invention dropped much more slowly and by the eighth cycle had substantially leveled off in activity yielding a product at the twelfth cycle of 88.3 Research Octane No. about the same as that produced at the sixth cycle by the comparison catalyst.

The foregoing description contains a limited number of embodiments of the present invention. It will be understood however, that numerous variations are possible without departing from the scope of the following claims.

What is claimed is:

1. A process for preparing catalysts consisting of a metal selected from the group consisting of platinum and palladium supported on a suitable spacing agent which comprises mixing particles of the dry, adsorptive spacing agent with an aqueous solution of a compound of a metal selected from the group consisting of platinum and palladium containing a small amount of a non-ashing wetting and dispersing agent in an amount sufficient to deposit 0.1 to 2.0 wt. percent platinum or 0.5 to 5.0 wt. percent palladium on the spacing agent and fixing the catalytic metal upon the support.

2. The process as defined in claim 1 in which the wetting and dispersing agent is a condensation product of ethylene oxide with a carboxylic acid.

3. The process as defined in claim 1 in which the wetting and dispersing agent is a poly-oxyethylene sorbitan fatty acid ester.

4. The process as defined in claim 1 in which the wetting and dispersing agent is a condensation product of ethylene oxide with a higher fatty alcohol.

5. The process as defined in claim 1 in which the wetting and dispersing agent is a condensation product of ethylene oxide with a phenol.

6. The process as defined in claim 1 in which the wetting and dispersing agent is a quaternary ammonium compound.

7. A process for preparing platinum on alumina catalysts which comprises mixing particles of dry, activated alumina with an aqueous solution of a platinum compound containing a small amount of a non-ashing wetting and dispersing agent in an amount sufficient to deposit 0.1 to 2.0 wt. percent platinum on the alumina and fixing the platinum upon the alumina.

8. A process for preparing platinum on alumina catalysts which comprises mixing particles of dry, activated alumina with an aqueous solution of a platinum compound containing a small amount of a non-ashing wetting and dispersing agent in an amount sufficient to deposit 0.1 to 2.0 wt. percent platinum on the alumina and fixing the platinum upon the alumina by treatment with hydrogen sulfide, drying and calcining the product.

9. A process for preparing platinum on alumina catalysts which comprises mixing particles of dry, activated alumina with an aqueous solution of a platinum compound containing a small amount of a non-ashing wetting and dispersing agent in an amount sufficient to deposit 0.1 to 2.0 wt. percent platinum on the alumina and fixing the platinum upon the alumina by drying the mixture at temperatures of up to about 700° F. and calcining the dried product at temperatures of 900°-1000° F.

10. A process for preparing platinum on alumina catalysts which comprises suspending particles of dry, activated alumina in a large volume of a dilute aqueous solution of a platinum compound containing a small amount of a non-ashing wetting and dispersing agent in an amount sufficient to deposit 0.1 to 2.0 wt. percent platinum on the alumina, maintaining the alumina in contact with said solution until the platinum compound is substantially completely adsorbed by the alumina and fixing the platinum upon the alumina by drying the mixture at temperatures of up to about 700° F. and calcining the dried product at temperatures of 900°-1000° F.

References Cited in the file of this patent

UNITED STATES PATENTS

| 1,970,578 | Schoeller et al. | Aug. 21, 1934 |
| 2,479,109 | Haensel | Aug. 16, 1949 |
| 2,479,420 | Segura | Aug. 16, 1949 |
| 2,532,497 | Hoekstra | Dec. 5, 1950 |

FOREIGN PATENTS

| 594,463 | Great Britain | Apr. 11, 1942 |